(12) United States Patent
Liu et al.

(10) Patent No.: US 7,130,107 B2
(45) Date of Patent: Oct. 31, 2006

(54) METHOD OF PREPARING ENCAPSULATED BICHROMAL BALLS

(75) Inventors: Ping Liu, Mississauga (CA); Man-Chung Tam, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 42 days.

(21) Appl. No.: 11/005,999

(22) Filed: Dec. 7, 2004

(65) Prior Publication Data

US 2006/0119926 A1    Jun. 8, 2006

(51) Int. Cl.
  *G02B 26/00*  (2006.01)
  *B01J 13/02*  (2006.01)
  *B01D 57/02*  (2006.01)
  *B29D 11/00*  (2006.01)

(52) U.S. Cl. .................. 359/296; 427/213.3; 204/471; 264/1.7

(58) Field of Classification Search ................ 359/296; 345/107; 427/213.3; 430/32; 252/583, 252/586; 204/471, 483; 264/4, 1.7; 428/402.2, 428/403
See application file for complete search history.

(56) References Cited

U.S. PATENT DOCUMENTS

| | | | |
|---|---|---|---|
| 3,215,572 A | 11/1965 | Papell et al. | |
| 3,697,437 A | 10/1972 | Fogle et al. | |
| 3,960,514 A | 6/1976 | Teng et al. | |
| 4,880,720 A | 11/1989 | Drappel et al. | |
| 5,037,716 A | 8/1991 | Moffat | |
| 5,132,355 A | 7/1992 | Nahlovsky | |
| 5,262,098 A | 11/1993 | Crowley et al. | |
| 5,344,594 A | 9/1994 | Sheridon | |
| 5,417,287 A | 5/1995 | Smith et al. | |
| 5,514,645 A | 5/1996 | McCabe et al. | |
| 5,604,027 A | 2/1997 | Sheridon | |
| 5,604,207 A | 2/1997 | DeFrees et al. | |
| 5,723,204 A | 3/1998 | Stefik | |
| 5,930,026 A | 7/1999 | Jacobson et al. | |
| 5,961,804 A | 10/1999 | Jacobson et al. | |
| 6,067,185 A | 5/2000 | Albert et al. | |
| 6,249,271 B1 | 6/2001 | Albert et al. | |
| 6,406,747 B1 | 6/2002 | Biegelsen et al. | |
| 6,445,490 B1 | 9/2002 | Chopra et al. | |
| 6,488,870 B1 * | 12/2002 | Chopra et al. | ................ 264/4.1 |
| 6,492,025 B1 | 12/2002 | Chopra et al. | |
| 6,515,649 B1 * | 2/2003 | Albert et al. | ................ 345/107 |
| 2004/0202862 A1 * | 10/2004 | Kazmaier et al. | ........... 428/403 |

FOREIGN PATENT DOCUMENTS

| | | |
|---|---|---|
| EP | 0338738 | 10/1989 |
| EP | 0207787 | 8/1992 |

* cited by examiner

*Primary Examiner*—Ricky Mack
*Assistant Examiner*—William Choi
(74) *Attorney, Agent, or Firm*—Eugene O. Palazzo; Fay, Sharpe, Fagan, Minnich & McKee, LLP

(57) ABSTRACT

Disclosed is a method of preparing encapsulated bichromal balls. The method involves forming capsules of electrophoretic particles encapsulated within a dielectric fluid such as a hydrocarbon solvent or siloxane oil that includes a small amount of a gelating agent. Bichromal balls are then formed by heating the capsules and applying an electric field. The capsules are then cooled while the electric field is maintained. Upon sufficient gelling, the electrophoretic particles are fixed within the gelled medium, i.e. the capsule. The bichromal gel produced detaches from the inside wall of the capsule, and thereby constitute the resulting encapsulated bichromal balls.

20 Claims, No Drawings

METHOD OF PREPARING ENCAPSULATED BICHROMAL BALLS

BACKGROUND

Illustrated herein are methods of preparing encapsulated bichromal balls and the resulting balls produced thereby. The methods find particular application in conjunction with the use of such balls in display devices, such as photochromic displays, and substrates such as "electric paper", and will be described with particular reference thereto. However, it is to be appreciated that the embodiments are also amenable to other like applications.

Bichromal rotatable elements, such as bichromal balls, or beads as sometimes referred to in the art, are tiny spheres, such as micron-sized wax beads, which have an optical and an electrical anisotropy. These characteristics generally result from each hemisphere surface or side having a different color, such as black on one side and white on the other, and electrical charge, i.e., positive or negative. Depending on the electrical field produced, the orientation of these beads will change, showing a different color (such as black or white) and collectively create a visual image.

In this regard, the spherical particles are generally embedded in a solid substrate with a slight space between each ball and the substrate being filled with a liquid so that the balls are free to rotate in a changing electrical field, but can not migrate from one location to another. If one hemisphere is black and the other is white, each pixel can be turned on and off by the electrical field applied to that location. As a result, each pixel can be individually addressed, and a full page image can thus be generated.

For example, reusable signage or displays can be produced by incorporating the tiny bichromal beads in a substrate such as sandwiched between thin sheets of a flexible elastomer and suspended in an emulsion. The beads reside in their own cavities within the flexible sheets of material. Under the influence of a voltage applied to the surface, the beads will rotate to present one side or the other to the viewer to create an image. The image stays in place until a new voltage pattern is applied using software, which erases the previous image and generates a new one. This results in a reusable signage or display that is electronically writable and erasable.

Conventional display devices, components for display devices, and the manufacture of such display devices and their components are described generally in Sheridon, U.S. Pat. No. 5,604,027; Jacobson et al., U.S. Pat. No. 5,961,804; Jacobson et al., U.S. Pat. No. 5,930,026; Albert et al., U.S. Pat. No. 6,067,185; Crowley et al., U.S. Pat. No. 5,262,098; Sheridon, U.S. Pat. No. 5,344,594; and, Stefik, U.S. Pat. No. 5,723,204, the contents of which are incorporated entirely herein by reference.

Gyricon or bichromal balls or beads utilized in these displays are typically produced by a spinning disc method and generally exhibit a wide size distribution, i.e., from about 50 to about 200 microns. The resolution of the Gyricon display is dependent on the bead size. The Gyricon beads used in current displays are from about 75 to about 110 microns ($\mu$m). However, for many applications, it is necessary to use bichromal beads of much smaller size in order to achieve higher resolution as well as lower switching voltage. It has been found extremely difficult to produce smaller beads while still maintaining acceptable characteristics such as bichromality, complementarity, sphericity, etc., and manufacturing yield.

Current Gyricon displays use a swollen elastomeric sheet in which Gyricon beads are dispersed. Recent investigation has shown that by encapsulating the Gyricon beads within an oil-filled capsule, the need to contain the swelling fluid as well as the need for the costly elastomer can be eliminated. However, the encapsulating process also produces some empty capsules, which must be completely removed in order to prevent degradation of the optical contrast of the display. This further adds to the cost and complexity of manufacture. Accordingly, there is a need for an improved method for encapsulating bichromal balls, without the problems or degree of such problems, as currently known.

The use of gelation or gelling techniques in the formation of bichromal balls is not generally known. Although the art refers to gel substrates for retaining bichromal balls, i.e. U.S. Pat. Nos. 5,604,027; Re 37,085; this approach merely employs a gelled substrate which houses a bichromal ball. That is, this description is not concerned with the actual formation of the bichromal ball itself. U.S. Pat. Nos. 6,488,870 and 6,492,025 describe forming a shell about a bichromal ball, which in certain embodiments, may be formed by certain gelation techniques. However, these approaches are not relevant to a process of forming the actual bichromal ball or bead.

BRIEF DESCRIPTION

In accordance with one aspect of this disclosure, a method of forming encapsulated bichromal balls is provided. The method comprises providing electrophoretic particles, and blending the particles with a dielectric fluid and an effective amount of a gelating agent. The method also comprises encapsulating the particles, dielectric fluid and gelating agent within a capsule or shell structure. The method further comprises heating the capsules to an elevated temperature and applying a field (i.e., electronic, magnetic, gravitational, etc.) to the capsules. The method also comprises cooling the capsules to thereby cause gelling within the capsule while the field is being maintained. Additionally, the method comprises removing the electric field and recovering the encapsulated bichromal balls.

As a result of this process, the bichromal gel produced in the capsules detaches from the inside capsule wall. The encapsulated bichromal balls or beads formed by this process can rotate within the capsules upon application of an imaging electric field. The disclosure also includes the encapsulated bichromal beads formed by this process and/or display devices utilizing the same.

These and other non-limiting aspects of the development are more particularly disclosed below.

DETAILED DESCRIPTION

The present disclosure relates to a method for producing encapsulated bichromal Gyricon beads, or balls as sometimes referred to herein, by gelation of migrated colored electrophoretic (or magnetically polarized particles) inside a capsule or shell structure. The gelation of the bichromal balls inside the capsule or shell structure occurs utilizing a heating and cooling cycle while applying a field (i.e., electronic, magnetic, gravitational, etc.). The bichromal gel becomes detached from the inside capsule while cooling, thereby forming an encapsulated bichromal ball.

The capsules prepared by the encapsulation process in accordance with the present discovery include, in addition to one or more species of charged, colored electrophoretic particles, a hydrocarbon solvent or siloxane oils with a small amount of gelating agent. By controlling the process parameters, the encapsulation process of the present discovery is capable of producing small sized capsules (i.e., from about 2 to about 750 microns, including from about 5 to about 200 microns, typically from about 10 to about 120 microns) with a narrow size distribution.

This process also produces encapsulated bichromal balls while minimizing the number of empty capsules produced, thus enhancing the yield.

Also disclosed herein are particles that, used in electronic display devices, are encapsulated in a fluid such as a dielectric fluid or oil. The particles are hemispheric bichromal balls which have an optical and an electrical anisotropy due to each hemisphere surface having a different color (e.g., one hemisphere is white and the other hemisphere is black) and electrical charge. The bichromal balls are free to rotate within the capsules in response to an applied electrical field. The bichromal balls are comprised, for example, of the following illustrative materials: as the matrix, a polarizable material such as a polymer or a wax-like polyethylene was may be used; the white pigment may be titanium dioxide; and the black pigment may be magnetite ($Fe_2O_3$) or carbon black. Bichromal balls and their fabrication are described in U.S. Pat. Nos. 5,262,098; 5,344,594; and, 5,604,027, the disclosures of which are totally incorporated herein by reference. In other embodiments, the bichromal balls can be made with made with magnetic anisotropy so that they are free to rotate within the microcapsules in response to an applied magnetic field.

Any fluid, or mixture of fluids, having dielectric properties may be used as the dielectric fluid to be encapsulated within the capsule shell along with the electrophoretic particles. Examples of dielectric fluids include partially fluorinated hydrocarbons, ISOPAR M or ISPOPAR L, polydimethyl siloxane oils, vegetable oils, etc., and combinations thereof.

ISOPAR is the brand name for various grades of high-purity isoparaffinic solvents with narrow boiling ranges, available from Exxon. The exceptional purity of ISOPAR is the basis for such desirable properties such as low odor, selective solvency, good oxidation stability, low electrical conductivity, and low skin irritation. The inherently low surface tension of ISOPAR also imparts superior spreadability to formulations utilizing ISOPAR. Other commercially available sources of isoparaffinic solvents can be used such as Ashpar from Ashland Chemical, Inc., Columbus, Ohio. Furthermore, examples of suitable fluids include those described in U.S. Pat. No. 6,067,185, the disclosure of which is totally incorporated herein by reference.

Some of the properties that the fluid should exhibit include chemical compatibility with the electrophoretic particles, capsule materials, as well as the gelling agents used; low dielectric constant; high volume resistivity; low viscosity; low toxicity; low water solubility; and having a similar density as well as refractive index to that of the electrophoretic particles.

The electrophoretic particles may be composed of any suitable material, where the composition of the particles depends on their intended use. Examples of different types of electrophoretic particles suitable for use herein are discussed in more detail below.

The amount and type of gelatin agent is also important. The gelatin agent must be of a type which is suitable in the dielectric fluid, particularly at encapsulation temperatures. Furthermore, the amount of gelatin agent is important in that too much gelatin agent increases the viscosity to the extent that the whole mixture could gel. However, too little amount of gelatin agent fails to produce an effective product. Preferably, the ratio of gelatin agent to the dielectric fluids or oil is from about 0.1 weight percent to about 10 weight percent, including from about 0.5 weight percent to about 5 weight percent, and from about 1.0 weight percent to about 3.0 weight percent. This range will ultimately depend upon the particular agent and system.

Numerous gelling agents may be used. The type of gelling agents that may be used can be heat reversible gelling agents for hydrocarbon organic solvents and hydrophobic organic or polymer liquids. The gelling agents should be able to dissolve in hydrophobic organic or polymer liquids with warming and be able to form a nearly transparent gel upon subsequent cooling. The gel should be stable in hydrophobic organic or polymer liquids, but able to dissolve with a well-defined melting point upon heating. The melting point of the gel depends on the polarity of the solvent and the concentration of the gelling agent. Preferably the melting point of the gelling agents is in a range of from about 45 to about 70° C. and the gelling point should be in a range of from about 20 to about 40° C.

An effective gelling or gelatin agent for use in this disclosure includes trans-4-t-butyl-1-phenyl-cyclohexanol (i.e., compound 2), prepared as shown below.

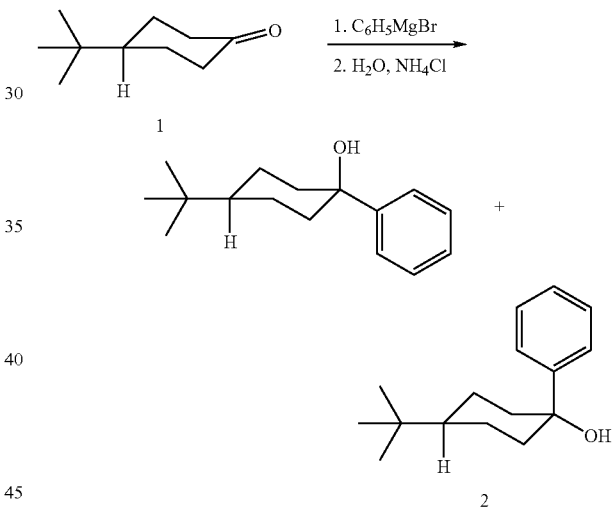

Interestingly, only the diastereomer with an axial aryl group exhibits any gellation ability. Compound 2 is a solid of low solubility in non-polar solvents. However, with warming the solid dissolves, and upon subsequent cooling a nearly transparent gel results. The gel is stable to the presence of additional non-polar solvents, but will re-liquefy with a well-defined "melting point" upon heating. This melting point depends on the polarity of the solvent and upon the concentration of the gelling agent: less polar solvents are immobilized at lower concentrations, and higher concentrations of 2 always result in higher melting points.

A wide array of additional gelating agents may be used in conjunction with the present discovery. For example, other gelling agents with similar properties can be used, such as those described in, but not limited to, EP 0207787; EP 0338738; U.S. Pat. Nos. 5,132,355; 3,960,514; 5,417,287; 5,514,645; "Method of Gelling Hydrocarbons and Fracturing Subterranean," McCabe et al. Publications; "New Carbohydrate-Based Gelling Agents for Organic Solvents," Tent et al. Cosmet. Toiletries (1977), 92(9), 39–40; and "Novel Family of Gelators of Organic Fluids and the Structure of Their Gels," Yih-chyuan Lin, Bechara Kachar, and Richard G. Weiss, J. Am. Chem. Soc. 1989, 111, 5542–5551; all of which are hereby incorporated by reference. Non-limiting examples of other gelating agents includes 4-t-butyl-1-fluorinated arylcyclohexanol derivatives.

Several different types of encapsulation processes (i.e., complex coacervation) can be utilized to produce capsules containing the electrophoretic particles, the hydrocarbon solvent or siloxane oils and the gelating agents. These are disclosed in more detail below.

Once encapsulated, formation of the bichromal balls is accomplished by heating the capsules to an elevated temperature, such as for example, from about 35° C. to about 100° C., including from about 35° C. to about 100° C., and applying a field, preferably an electric field. This causes the colored charged particles to migrate in an opposite direction inside the capsules. Other fields, such as magnetic, gravitational, etc., can also be applied. By cooling the capsules, such as to room temperature while maintaining the field, the solvent phase gels, thereby yielding a fixed bichromal bead. The field is then removed and the encapsulated bichromal beads or balls are collected.

During this process, heating temperatures must be higher than the gelation temperature of the mixture of the dielectric fluids and gelation agent used. Additionally, the magnitude of the field should be at least sufficient to migrate the electrophoretic particles.

Upon completion of the process, surprisingly, the bichromal gel detaches from the capsule wall. Thus, the bichromal balls formed by this method can rotate in the capsules in response to an imaging electric field in a fashion very similar to spinner-made Gyricon bichromal balls. An advantage of the rotation is robustness and longevity in comparison to corresponding electrophoretic devices which require the continual migration of many small particles. The encapsulated bichromal displays produced by the present disclosure exhibit much more enhanced image stability in comparison to conventional electrophoretic displays.

It should be noted that the particle migration/gelation step can be accomplished as part of the bichromal ball manufacturing process or as part of a display fabrication process.

A wide array of electrophoretic particles can be used. The type of particles used will depend on the color of the display image that is required. The particles are submicron in size. The particles should be charged or capable of acquiring a charge, i.e. exhibit electrophoretic mobility. Particles that may be used include pigments such as, but not limited to, titania, carbon black, etc., or dyed pigments, polymers or pigment/polymer composites.

Electrophoretic particles useful in the art of liquid toners or electrophoretic displays may be used in the present discovery and comprise composite particles of a pigment and a resin. Examples of suitable resins include polyethylene and polypropylene and their copolymers, including ethylene-vinyl acetate copolymers and combinations thereof. Examples of suitable pigments include rutile titania, anatase titania, barium sulfate, zinc oxide, carbon black, Sudan blue, Hostaperm pink, etc., and combinations thereof.

Additional examples of electrophoretic particles include, but are not limited to, particles of a pigment and a resin. Examples of suitable resins include polyethylene and polypropylene and their copolymers, including ethylene-vinyl acetate copolymers such as the Elvax® I resins available from E.I. DuPont Corporation, copolymers of ethylene and an $\alpha,\beta$-ethylenically unsaturated acid selected from acrylic or methacrylic acid, where the acid moiety is present in an amount of from 0.1 to 20 percent by weight, such as the Elvax® II resins available from E.I. DuPont Corporation, chlorinated olefins such as chlorinated polypropylene, including CP-343-1, available from Eastman Kodak Company, poly-$\alpha$-olefins such as polyoctadecene and polyhexadecene, and the like. Within the particles, the resin is generally present in an amount of from about 60 to about 95, and preferably from about 70 to about 90, percent by weight with respect to the pigment. Examples of suitable pigment materials include Raven® 5750 and Raven® 3500, available from Columbian Chemicals Company, Mogul L, available from Cabot Corporation, Regal® 330 carbon black, available from Cabot Corporation, Vulcan XC-72R, available from Cabot Corporation, Sudan Blue OS, available from Ciba-Geigy Inc., Hostaperm Pink E, available from American Hoechst Corporation, Novaperm 3010, available from American Hoechst Corporation, Lithol Rubine DCC-2734, available from Dominion Color Company, Toner 8200, available from Paul Uhlich & Company, Toner 8200, and the like. Generally, any pigment material is suitable provided that it consists of small particles and that it combines effectively with the polymeric resin material. Pigments, however, can affect the charging characteristics of the particles, and a pigment of the desired color must be chosen such that it imparts to the particles a charge of the desired polarity and magnitude when mixed with a specific charge director. A specific pigment may result in a particle charging either positively or negatively, depending upon the charge director used. The particles should have an average particle diameter of from about 0.1 micron to about 10 microns, and preferably from about 0.5 to about 3 microns, as determined by a Horiba CAPA-500 centrifugal particle size analyzer, available from Horiba Instruments, Inc., Irvine, Calif., which determines average volume particle diameter. The particles may be present in amounts of from about 0.5 to about 8, and preferably from about 2 to about 4, percent by weight of the composition.

In certain embodiments, the electrophoretic particles can be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

One type of exemplary particle is titania. The titania particles may be coated with a metal oxide, such as aluminum oxide or silicon oxide, for example. The titania particles may have one, two, or more layers of metal-oxide coating. For example, a titania particle may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black (BRG (Ciba), Orasol Black RBL (Ciba), Acetamine Black, CBS (E.I. duPont de Nemours and Company, Wilmington, Del.), Crocein Scarlet N Ex (E.I. du Pont de Nemours and Company) (27290), Fiber Black VF (duPont) (30235), Luxol Fast Black L (duPont) (Solv. Black 17), Nirosine Base No. 424 (E.I. du Pont de Nemours) (50415B), Oil Black BG (E.I. du Pont de Nemours) (Solv. Black 16), Rotalin Black RM (E.I. du Pont de Nemours), Sevron Brilliant Red 3 B (E.I. du Pont de Nemours); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (OAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLOS Conc. CF (GAF) (53295), Katigen Deep Black NND Hi Conc. CF (GAF) (15711), Rapidogen Black 3 G (OAF) (Azoic Blk. 4); Sulphone Cyanine Black BA-CF (GAF) (26370), Zamkbezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 µm), Statex B-12 (Columbian Carbon Co.) (a furnace black of 33 µm average particle size), and chrome green.

Particles may also include laked, or dyed, pigments. Laked pigments are particles that have a dye precipitated on them or which are stained. Lakes are metal salts or readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining lattices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 µm, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two g/ml. This difference is preferably between about zero and about 0.5 g/ml.

Useful polymers for the particles include, but are not limited to: polystyrene, polyethylene, polypropylene, phenolic resins, E.I. du Pont de Nemours Elvax resins (ethylenevinyl acetate copolymers), polyesters, polyacrylates, polymethacrylates, ethylene acrylic acid or methacrylic acid copolymers (Nucrel Resins—E.I. du Pont de Nemours, Primacor Resins—Dow Chemical), acrylic copolymers and terpolymers (Elvacite Resins, E.I. du Pont de Nemours) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. From the following non-limiting examples, it may be seen that the processes and materials for both the fabrication of particles and the charging thereof are generally derived from the art of liquid toner, or liquid immersion development. Thus any of the known processes from liquid development are particularly, but not exclusively, relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Further examples of suitable electrophoretic particles may be found in U.S. Pat. Nos. 4,880,720 and 6,249,271, col. 12, line 52 to col. 15, line 23; the disclosures of which are hereby incorporated in their entirety.

The electrophoretic particles can include colloidal dispersions of fine powdered magnetic materials such as, but not limited to, ferrite, nickel, cobalt, iron, or various oxides thereof such as magnetite in a suitable polymeric binder. These particles will be able to migrate in a fluid in response to the application of a magnetic field. For example, various powdered magnetic materials such as nickel, cobalt, iron or various iron oxides may be used; including the black oxide of iron, magnetite ($Fe_3O_4$). The particle size of the magnetic particles preferably should be less than 0.25 micron in diameter to insure that a true colloid is formed and, advantageously, may include particles of less than 0.10 micron in diameter.

Although extremely fine particle sizes are obtainable by several known processes (e.g.: vacuum deposition, condensation, and chemical precipitation or combination), grinding has been found to be a simple and satisfactory method for obtaining a colloidal suspension of the magnetized iron particles. Dispersion is accomplished by grinding commercially obtained powdered magnetite (a particle size of approximately 30 microns) in a ball mill in the presence of a grinding agent, which prevents agglomeration or welding of the minute particles as grinding progresses. Generally, the grinding aid should comprise between 2 to 10 percent by weight of the metal particles and the grinding process continues until the colloid solution is composed of 0.5 to 10 percent by weight of suspended magnetic particles. Further reference can be found in U.S. Pat. No. 3,215,572, hereby incorporated by reference.

The type of particles used will depend on the color of the desired image. These particles are generally submicron in size. They may be highly effective in scattering light (such as titania) while other particles may be highly absorptive (such as carbon black). The particles should be charged or capable of acquiring a charge of the desired polarity and magnitude when mixed with a specific charge control additive. The pigments should effectively disperse the polymeric resin material.

Charge control additives are optionally used to provide and/or enhance the charge of electrophoretic particles to yield good electrophoretic mobility. Charge control additives suitable for the present discovery include, but are not limited to, iron naphthenate and zirconium octoate, lecithin, barium petronate, and the like.

The encapsulation process is preferably by complex coacervation. When complex coacervation is employed, cationic and anionic materials are used to form the capsule material. The cationic material and the anionic material are oppositely charged polyelectrolytes which upon mixing will form a polyelectrolyte complex with low solubility in water, leading to coacervation and formation of a protective microencapsulating shell around each droplet. Suitable polyelectrolytes for the cationic material and the anionic material include, for example, polyphosphates (e.g., polyphosphorylated carbohydrates) and polycarboxylates (e.g., polyacrylates and polymethacrylates), which may be combined with cationic polymers such as poly-N-ethyl-4-vinylpyridine or poly-2,5-ionene bromide.

Other examples of anionic polymers are polysaccharides and their derivatives such as acacia (gum arabic), carrageenan, agarose, alginic acid and salts thereof, heparin, hyaluronan, pectins and their derivatives such as sodium amylosulphate. These may be combined with cationic materials such as chitosan or cationic cellulose derivatives, e.g., from hydroxyethylcellulose, such as Polymer JR (Union Carbide). Further examples of the anionic material are inorganic salts. The inorganic salt may be, for instance, a polyphosphate. Inorganic polyphosphate materials include, for example, alkali metal phosphates, phosphate glasses, alkali metal hexametapolyphosphates such as sodium hexametaphosphates (trade name CALGON™). Other inorganic polyphosphates include HYPHOS™ ($Na_{12}P_{10}O_{31}$, which contains 65 wt % $P_2O_5$), HEXATREN™ R, and HEXATREN™ N, including those disclosed in U.S. Pat. Nos. 6,488,870 and 3,697,437, the disclosures of which are totally incorporated herein by reference.

While complex coacervation is generally used to encapsulate the electrophoretic particles as described herein, alternative encapsulation processes are also feasible. As the shell of the encapsulated Gyricon elements, a polymeric shell is typical. While any suitable polymer material may be used without limitation for the shell, the shell can be a polymer derived from two monomers that can be dissolved, respectively, in two mutually immiscible solvents (such as, for example, organic solvents and water). This enables the polymer to be formed at the interface of the two solvents via interfacial condensation polymerization, as more fully explained below.

Shell polymers suitable for use with the embodiments described herein include those which may be formed in an interfacial condensation polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01 percent to about 30 percent as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

Particularly, the polymer shell material is comprised of a polyamide (from, e.g., diacid chloride and diamine monomers), a polyester (from, e.g., diacid chloride and diol monomers), a polyurea (from, e.g., diisocyanate and diamine monomers), a polyurethane (from, e.g., diisocyanate and diol monomers) or mixtures thereof. The diacid chloride monomers and diisocyanate monomers may be dissolved in an organic phase, while the diamine and diol monomers may be dissolved in an aqueous phase.

Suitable shell monomers are usually selected from monomers where the number of chemical reacting groups per molecule is two or more. The number of reacting groups per molecule is referred to as the chemical functionality. An organic soluble shell monomer, which has a functionality of 2 or more, reacts with an aqueous soluble shell monomer, which has a functionality of 2 or more, via interfacial condensation polymerization to generate the shell polymer in an embodiment of the present discovery.

The organic soluble shell monomer can include (1) diisocyanates such as, for example, toluene diisocyanate, nexamethylene diisocyanate, trans-1,4-cyclohexane diisocyanate, meta-tetramethylxylene diisocyanate (m-TMXDI), trimethylhexamethylene diisocyanate (TMDI), nexane diisocyanate (HDI), 4,4'-dicyclohexylmethane diisocyanate (Desmodur W), 4,4'-methyldiphenyl diisocyanate and even diisocyanate prepolymers such as polyether based liquid urethane prepolymer such as the Adiprene series available from DuPont; XPS and XPH series which are toluene diisocyanate terminated polyethylene oxide prepolymers available from Air Product, or (2) diacid chlorides (or, more generally, diacid halides), such as, for example, sebacoyl chloride, terephthaloyl chloride, phthaloyl chloride, isophthaloyl chloride, azeloyl chloride, glutaryl chloride and/or adipoly chloride. Examples of organic soluble shell monomers which have a functionality greater than 2 include 1,3,5-benzenetricarboxylic acid chloride; Isonate 143L (liquid MDI based on 4,4'-methyldiphenyl diisocyanate) purchased from The Upjohn Company; and tris(isocyanatophenyl) thiophosphate (Desmodur RF) purchased from Mobay Chemical Corporation.

Examples of monomers soluble in aqueous media and with a functionality of two (2) include (1) diamines such as, for example, 1,6-hexanediamine, hexamethylenediamine, 1,4-bis(3-aminopropyl)piperazine, 2-methylpipeazine, m-xylene-α,α'-diamine, 3,3'-diamino-N-methyldipropylamine, 1,3-cyclohexanebis(methylamine), 1,4-diaminocyclohexane, 2-methylpentamethylene diamine, 2-methylpentanediamine (Dytek A) purchased from DuPont, 1,2-diaminocyclohexane, 1,3-diaminopropane, 1,4-diaminobutane, 2,5-dimethylpiperazine, piperazine, fluorine-containing 1,2-diaminobenzenes purchased from PCR Incorporated, and N,N'-dimethylethylenediamine; (2) diols such as bisphenol A, other bisphenols such as 4,4'-biphenol, 4,4-dihydroxydiphenyl ether, 3,3'- and 4,4'-(ethylendioxy)diphenol, 3,3'- and 4,4'-(butylenedioxy) diphenol, 4,4'-(hexafluoroisopropyldene)diphenol, 3,3'-and 4,4'-dihydroxydiphenyl ether, 3,3'- and 4,4'-biphenol, 4,4'thiobisphenols, 4,4'-bis[1,3-phenylenebix(1-methylethylidene)]bisphenol, 4,4'-bis(4-hydroxyphenyl)valeric acid and its alkylates,I phenolphthalein and 3,3'- and 4,4'-methylenediphenols. Other diols which may be used include aliphatic diols such as: neopentyl glycol, ethylene glycol, propylene glycol, butylenes glycol, diethylene glycol, dipropylene glycol, or mixtures thereof, or any other water soluble copolycondensation coreactant monomers/prepolymers. Other aqueous soluble shell monomers having a functionality greater than 2 include diethylene triamine, bis(3-aminopropyl)amine, tris(2-aminoethyl)amine (TREN-HP) purchased from W.R. Grace Company, and the like.

More than one organic phase monomer can be used to react with more than one aqueous phase monomer. Although formation of the shell entails reaction in an embodiment between at least two shell monomers, one soluble in organic phase and one soluble in aqueous phase, as many as 5 or more monomers soluble in the organic phase and as many as 5 monomers soluble in aqueous phase can be reacted to form the shell. In some preferred instances, 2 monomers soluble in the organic phase and 2 monomers soluble in aqueous phase can be reacted to form the shell.

Further, optional reaction aids such as catalysts or curing agents, may be added to either of the solutions, if desired.

For example, a shell crosslinking agent such as Desmodur RF (Bayer) may be added to the organic phase, if desired, in effective amounts of, for example, from about 0 to about 3 percent by weight of the monomers.

While several methods may be used to derive the encapsulating shell surrounding the dielectric fluid and the Gyricon sphere, the process of complex coacervation is typically used. Alternate processes, such as interfacial condensation polymerization can also be used. As mentioned above, interfacial condensation polymerization occurs at the interface between two mutually immiscible solvents, usually an organic based solvent and an aqueous solvent (i.e., a water-based solution).

In one embodiment, the process involves forming the organic solution/dispersion by dispersing the Gyricon spheres in a solution containing an organic solvent, a monomer dissolved therein for example a diacid chloride or a diisocyanate monomer, and optionally also containing a dielectric fluid. Preferably, the solvent is itself a dielectric fluid such as an aliphatic hydrocarbon made by ISOPAR L or ISOPAR M). However, the process can equally proceed using any organic solvent whether dielectric or not, such as any hydrocarbon liquid, so long as if the solvent is not a dielectric fluid, a dielectric fluid is also present in the solution.

The amount of the solvent compared to the amount of the Gyricon spheres in the organic phase dispersion should be such that the Gyricon spheres can each be coated with the dielectric fluid, e.g., by surface energy attraction of the fluid around the surface of the spheres. As an example, from about 10 to about 95 percent by weight Gyricon spheres can be added to the organic phase dispersion. The monomer level in the organic phase may be from, for example, about 1 to about 100% (100% meaning neat monomer is the solvent).

The organic phase dispersion is next brought into contact with an aqueous phase solution containing a monomer that coreacts with the monomer dissolved in the organic phase, for example a diamine or diol monomer. This solution is made by dissolving the monomer in water, preferably deionized water. The upper end of the monomer level in the aqueous phase is determined where the organic phase just barely becomes miscible with the aqueous phase. The monomer level thus may be, for example, from about 1 to about 50% monomer in aqueous solution.

Within the polymeric shell, the molar ratio of the organic soluble monomer to the aqueous soluble monomer is from about 1:1 to about 1:4, and preferably from about 1:1 to about 1:1.5.

In general, the interfacial condensation polymerization is conducted by first coating the Gyricon sphere with a first organic phase composition containing a first monomer dissolved in the organic solvent, and optionally a dielectric liquid, and subsequently exposing the coated Gyricon sphere to a second aqueous phase composition containing a second monomer dissolved in the aqueous solvent, whereby the first monomer and the second monomer are made to react to form the encapsulating shell.

In one embodiment, this is accomplished by first mixing the Gyricon spheres into the organic phase composition, followed by exposing the coated spheres to the aqueous phase composition. In this embodiment, the organic phase is brought into contact with the aqueous phase, for example by dropwise addition of the organic phase dispersion into the stirred aqueous phase solution. Upon contact, the monomers react (via a condensation reaction), forming a polymer skin around the droplets. As a result, the polymer shell is formed around the core of Gyricon sphere and the dielectric fluid.

The reaction generally occurs under agitation, for example stirring. The polymeric shell typically forms very quickly upon contact of the two phases. However, the stirring and contact can continue for a period of, for example, about 1 minute to about 2 hours or more, if desired.

In another embodiment, the coating with the organic phase and exposure to the aqueous phase compositions can be done through the use of an ink-jet device, for example as detailed in U.S. application Ser. No. 09/772,565, now U.S. Pat. No. 6,406,747, incorporated herein by reference in its entirety. Briefly, the method comprises first jetting a precise amount of the organic phase composition onto the Gyricon sphere, which may be done by, for example, dropping the Gyricon sphere past the ink jet nozzle. The coating will wet the entire surface of the Gyricon sphere due to surface energies. The Gyricon sphere coated with the organic phase composition is then moved past an ink jet nozzle where it is jetted/sprayed with the aqueous phase composition, thereby causing reaction and the encapsulation.

In a still further embodiment, the coating with the organic phase and exposure to the aqueous phase compositions is conducted by dropping the Gyricon sphere through a fog of the organic phase composition and then subsequently dropping the coated Gyricon sphere through a fog of the aqueous phase composition. This method is also detailed in U.S. application Ser. No. 09/772,565, now U.S. Pat. No. 6,406, 747, incorporated herein by reference in its entirety. Briefly in this embodiment, separate fogs are created of both the organic phase and aqueous phase compositions, and the Gyricon sphere is made to successively pass first through the fog of the organic phase and then through the fog of the aqueous phase. The Gyricon sphere may be dropped through both fogs successively if the fogs are made to have the organic phase fog about the aqueous phase fog. Like the ink jet embodiment above, the fog embodiment enables more precise control over the amounts of the compositions coated upon the sphere, thereby enabling more precisely sized encapsulated spheres to be derived and less waste of materials.

The condensation reaction can be conducted at room temperature for economies. However, elevated temperatures may be used, if desired, to aid in the reaction. Following the encapsulation, the encapsulated Gyricon elements are collected by any suitable method known in the art. Following collection, the encapsulated Gyricon elements may be washed, if desired. Further details regarding materials and processes are described in U.S. Pat. No. 6,445,490, herein incorporated by reference.

After the capsules have been formed, they are then heated while an electric field is still applied. The field polarizes each particle within its respective capsule. The capsules are then cooled to cause gelling to occur while the field is maintained. Upon sufficient gelling, the electrophoretic particles are then fixed within the gelled medium, i.e. the capsule, and the bichromal balls inside the capsule are thereby formed.

The present development provides a new method to produce encapsulated bichromal balls by gelation of migrated colored electrophoretic or magnetically polarized particles inside the capsules. The resulting bichromal balls are spherical or nearly spherical, separated from the capsule wall, possess a dipole moment and are free to rotate in response to the application of an electric field.

The size ranges for the capsules formed is from about 2 to about 350 microns. The general size range is from about 5 to about 200 microns and the typical size range is from about 10 to about 100 microns.

The present encapsulated bichromal balls may be dispersed into any suitable medium which may be a liquid, a solid, or a gas, to form a display or a display surface. When these encapsulated bichromal balls constitute voltage sensitive members, the capsules may be dispersed in any medium across which an electrical field may be impressed. Most commonly, this medium will be a solid, with the particle or particles dispersed in this solid while it is in a liquid phase. It may be subsequently hardened by chemical reaction, by cooling, or the like. The medium may also be a liquid, or a slurry, consisting of a liquid and solid particles, or solid particles whose purpose might be to immobilize the capsules. Indeed, any medium might be used to contain the capsules provided that it does not damage the shell of the capsule or diffuse undesirable chemicals across the shell.

A series of trials were conducted to further investigate the present discovery. A collection of microcapsules were made by the following non-limiting method:

To a 500 ml Morton reaction flask, 5 grams of gelatin (300 broom from swine) and 110 ml of cold distilled water were added and the mixture was stirred in a 60° C. water bath for about 0.5 hour. 10 grams of 5 wt % sodium polyphosphate was added and the pH value of the mixture was adjusted to about 4.0 to 4.5 with acetic acid to induce formation of the coacervate. After the coacervate was formed, 21.6 grams of a mixture containing small amount of dye (blue Nile) and white electrophoretic particles of $TiO_2$ in ISOPAR M (about 5 wt %) with 0.216 grams of gelling agent trans-4-t-butyl-1-phenyl-cyclohexanol was then added. The mixture was stirred at a temperature range from 60° to 30° C. for about 6 hours and the capsules were formed. The capsule walls were crosslinked by reaction with glutaric dialdehyde and urea-formaldehyde. The capsules were washed with water, collected by filtration, and dried by a freeze drying process.

The release liner of an adhesive label (produced commercially by Xerox) was removed. The resulting sheet consists of an adhesive layer coated on white paper. Capsules prepared as described above were cascaded over the adhesive surface several times to yield a very uniform coating. A display device was made by sandwiching the coated paper between two pieces of conducting glass having indium tin oxide conductive coating as electrodes. Microscopic examination of the device showed that there were no empty capsules.

The device was heated to a temperature of about 50° C. using a hot plate. Application of an electrical voltage about 300 to 500 volts of one polarity caused the colored charged electrophoretic particles to migrate in opposite direction within the capsules. The electric field was removed after the device was cooled to room temperature to yield a bichromal ball.

The operation of the display was demonstrated as follows. Application of an electrical voltage (about 200 to 300 volts) of one polarity caused the bichromal balls to orient preferentially in one direction (blue). Reversing the polarity of the electric field caused the bichromal balls to orient in the opposite direction (white).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process of forming encapsulated bichromal balls, said process comprising:
providing electrophoretic particles;
blending said particles with (i) a dielectric fluid, and (ii) an effective amount of a gelating agent;
providing a shell material;
forming capsules by encapsulating said particles, dielectric fluid, and gelating agent within a shell of said shell material;
heating said capsules to an elevated temperature;
applying a field to said capsules to separate the particles;
cooling said capsules to thereby cause gelling within said capsule while said field is maintained;
removing said field.

2. The process of claim 1, wherein said dielectric fluid is selected from the group consisting of partially fluorinated hydrocarbons, isoparaffins, polydimethyl siloxane oils, vegetable oils, and combinations thereof.

3. The process of claim 1, wherein said heating is performed to a temperature of from about 35° to about 100°.

4. The process of claim 1, wherein said heating is performed to a temperature of from about 35° to about 70°.

5. The process of claim 1, wherein said electrophoretic particles are pigments selected from the group consisting of titania, carbon black, and combinations thereof.

6. The process of claim 1, wherein said electrophoretic particles are composite particles of a pigment and a resin, wherein said pigment is selected from the group consisting of rutile titania, anatase titania, barium sulfate, zinc oxide, carbon black, Sudan blue, Hostaperm pink, and combinations thereof.

7. The process of claim 6, wherein said resin is selected from the group consisting of polyethylene, polypropylene, copolymers of polyethylene and polypropylene, ethylene-vinyl acetate copolymers, and combinations thereof.

8. The process of claim 1, wherein said shell material is selected from the group consisting of polyphosphates, polycarboxylates, and combinations thereof.

9. The process of claim 1, wherein said particles exhibit two colors.

10. The process of claim 1, wherein said electrophoretic particles include fine powdered magnetic materials selected from the group consisting of ferrite, nickel, cobalt, iron, oxides thereof, and combinations thereof.

11. The process of claim 10, wherein said capsules have a size of from about 5 to about 200 microns.

12. The process of claim 1, wherein said capsules have a size of from about 2 microns to about 750 microns.

13. The process of claim 12, wherein said capsules have a size of from about 10 microns to about 120 microns.

14. The process of claim 1, wherein said field applied to the capsules is a field selected from the group consisting of electronic, magnetic, and gravitational fields.

15. A display device produced with the encapsulated bichromal balls of claim 14.

16. The encapsulated bichromal balls produced by the process of claim 1.

17. A process of forming encapsulated bichromal balls, said process comprising:
providing electrophoretic particles;
blending said particles with (i) a dielectric fluid, and (ii) an effective amount of a gelating agent, wherein said gelating agent is selected from the group consisting of materials capable of gelling hydrophobic organic liquids;
providing a shell material;
forming capsules by encapsulating said particles, dielectric fluid, and gelating agent within a shell of said shell material;
heating said capsules to an elevated temperature;
applying a field to said capsules to separate the particles;
cooling said capsules to thereby cause gelling within said capsule while said field is maintained; and
removing said field.

18. The process of claim 17, wherein said gelating agent includes trans-4-t-butyl-1-phenyl-cyclohexanol and derivatives.

19. A process of forming encapsulated bichromal balls, said process comprising:
providing electrophoretic particles;
blending said particles with (i) a dielectric fluid, and (ii) an effective amount of a gelating agent;
providing a shell material;
forming capsules by encapsulating said particles, dielectric fluid, and gelating agent within a shell of said shell material;
heating said capsules to an elevated temperature;
applying a field to said capsules to separate the particles;
cooling said capsules to thereby cause gelling within said capsule while said field is maintained; and
removing said field;
wherein said gelating agent is present in a concentration of from about 0.1% to about 10% by weight of said dielectric fluid.

20. The process of claim 19, wherein said gelating agent is present in a concentration of from about 0.5% to about 5% by weight of said dielectric fluid.

* * * * *